United States Patent
Oltman

[11] Patent Number: 5,945,230
[45] Date of Patent: Aug. 31, 1999

[54] TOED-IN ANODE CAN AND ELECTROCHEMICAL CELL MADE THEREWITH

[75] Inventor: John Edward Oltman, Mount Horeb, Wis.

[73] Assignee: Rayovac Corporation, Madison, Wis.

[21] Appl. No.: 08/829,440

[22] Filed: Mar. 28, 1997

[51] Int. Cl.⁶ .......................... H01M 2/02; H01M 12/06
[52] U.S. Cl. .......................... 429/27; 429/174; 429/175; 72/361
[58] Field of Search .................. 429/27, 174, 175, 429/245; 72/361

[56] References Cited

U.S. PATENT DOCUMENTS

| | | | |
|---|---|---|---|
| 3,690,279 | 9/1972 | Thompson et al. | 72/361 |
| 3,845,653 | 11/1974 | Hilgenbrink | 72/361 |
| 4,121,020 | 10/1978 | Epstein et al. | 429/174 X |
| 4,150,221 | 4/1979 | Coueille | 429/174 X |
| 4,238,555 | 12/1980 | Uetani et al. | 429/163 |
| 4,256,815 | 3/1981 | Smilanich et al. | 419/185 |
| 4,392,764 | 7/1983 | Kubis et al. | 413/69 |
| 4,419,420 | 12/1983 | Ishizaki | 429/174 X |
| 4,557,983 | 12/1985 | Sauer | 429/27 |
| 5,279,905 | 1/1994 | Mansfield, Jr. et al. | 429/27 |
| 5,567,538 | 10/1996 | Oltman et al. | 429/27 |
| 5,576,117 | 11/1996 | Morita et al. | 429/162 |
| 5,582,930 | 12/1996 | Oltman et al. | 429/27 |
| 5,582,932 | 12/1996 | Oltman et al. | 429/176 |
| 5,591,541 | 1/1997 | Oltman et al. | 429/171 |

*Primary Examiner*—Stephen Kalafut
*Attorney, Agent, or Firm*—Thomas D. Wilhelm; Michael L. Winkelman

[57] ABSTRACT

This invention pertains to electrochemical cells, and anode cans used therein, wherein edge regions of respective anode cans are toed-in. The anode can includes a top wall, and a first side wall depending downwardly from the top wall. The first side wall has an edge region remote from the top wall. The cathode can has a bottom wall, and a second side wall extending upwardly from the bottom wall. The edge region of the first side wall is displaced inwardly of the outer surface of the first side wall as defined at locations away from the edge region. Thus, the edge region is toed-in. Generally, the first side wall follows a path from an intermediate element of the first side wall to a distal edge of the first side wall, wherein no element of the path is directed toward the top wall. The invention further comprehends methods of making the above metal anode cans, and cells.

66 Claims, 5 Drawing Sheets

TOED-IN ANODE CAN AND ELECTROCHEMICAL CELL MADE THEREWITH

BACKGROUND

This invention relates to button-size electrochemical cells, and especially to metal-air cells of the zinc-air type. Such cells are used for a variety of applications. A large fraction of such cells are used in hearing aids. Newer versions of such hearing aids are placed inside the outer portion of the human ear, whereby any leakage of material from the cell may come into contact with the skin of the wearer, in the wearer's ear. Accordingly, it is critical that such cells not leak any of the alkaline electrolyte which is routinely used in such cells.

Further, to the extent such leakage is detected in the manufacturing process, quality control efforts must be expended to reduce or preferably eliminate such leakage wherever practical. Such quality control efforts, of course, bear associated costs. Therefore, any advance in reducing leakage of electrolyte is significant to the health of the consumer of such cells, as well as to the commercial value of such cells to the manufacturer.

Further, the overall volume of the void space inside the cell, useful for containing electrochemically reactive materials, is limited to that space not occupied by non-reactive components of the cell. Thus, to the extent use of internal void space by non-reactive components can be controlled or reduced, additional electrochemically reactive material may be used in the cell, and the use life of the cell thereby extended. Accordingly, any effort expended in controlling leakage must be accompanied by a sensitivity to any reduction in the space which is available for use in containing electrochemically reactive materials in the anode can.

One potential source of leakage is leakage past the seal which separates side walls of the anode can and the cathode can. Such seal must participate in the equivalent of a frictional engagement with both side walls and associated sealing fluids, or other materials, in order to successfully provide the necessary seal function. Such frictional engagement with the anode can is routinely obtained by a sliding assembly of the anode can and the seal to each other, wherein, in conventional such assemblies, the (plastic) seal may be damaged by the anode can. Such damage is difficult to detect, and thus such damaged cells may well leave the manufacturing facility undetected.

Further, during final assembly of the cell, pressure exerted by the distal edge of the anode can against the seal, and indirectly against the underlying cathode assembly, causes that portion of the cathode assembly which is disposed inwardly of the seal to rise toward the top wall of the anode can (doming), and thus to somewhat withdraw from its location adjacent the bottom wall of the cathode can. Such doming is desirable to the extent it facilitates formation of an adequately-sized air reservoir between the cathode assembly and the bottom wall of the cathode can. However, the amount of doming corresponds with a respectively reduced amount of the anode volume being available for receiving and containing electrochemically reactive anode material in the anode can. Therefore, it is highly desirable to configure the respective elements of the cell, in cooperation with the assembly process, so as to closely control doming of the cathode assembly toward the top wall of the anode can to accommodate efficient formation of the air reservoir while minimizing the amount of the anode volume which is thus occupied by such movement of the cathode assembly during the cell assembly process.

It is an object of this invention to provide improved anode cans, and electrochemical cells made therefrom, wherein the cells have less tendency to leak electrolyte, and wherein a high fraction of the anode void volume of a conventional anode can is retained while improving control of doming of the cathode assembly.

It is another object to provide an anode can having a normal full-size perimeter over the major portion of the side wall of the anode can, and a reduced perimeter edge region adjacent the distal edge thereof.

Yet another object is to provide an anode can wherein the outer surface of the edge region of the anode can side wall is displaced inwardly of the outer surface of the anode can side wall as defined at locations away from the edge region.

A further object is to provide an anode can wherein the edge region is displaced inwardly of an intermediate region of the side wall of the anode can, and wherein the average thickness of the side wall between the intermediate region and a distal edge of the side wall is less than twice the thickness of the side wall in the intermediate region.

It is still another object to provide electrochemical cells made with the above anode cans.

SUMMARY

Some of the objects are obtained in an electrochemical cell comprising an anode, a cathode, and a seal between the anode and the cathode. The anode includes an anode can, and electrochemically reactive anode material in the anode can. The anode can includes a top wall, and a first side wall depending downwardly from the top wall. The first side wall has an outer surface, and an edge region remote from the top wall.

The cathode includes a cathode can, and a cathode assembly inside the cathode can. The cathode can has a bottom wall, and a second side wall extending upwardly from the bottom wall, the second side wall having an inner surface.

The first side wall of the anode can is received inside the second side wall of the cathode can. The first outer surface of the anode can, at the edge region, is displaced inwardly of the first outer surface as defined at locations away from the edge region.

In preferred embodiments, the clearance between the first and second side walls at the edge region is greater than the clearance between the first and second side walls at locations away from the edge region.

Further to preferred embodiments, the first side wall includes an intermediate region associated with a first full-size cross-section portion of the anode can, between the top wall and the edge region. The edge region thus provides a second reduced-size cross-section portion of the anode can.

The anode and cathode are joined together with the seal between the first and second side walls and, in combination, defining a top and a bottom of the cell, and a height therebetween. The second side wall defines a maximum perimeter of the electrochemical cell. The cell height and the maximum perimeter, in combination, define an overall volume of the cell. An anode volume is defined inwardly of the first side wall.

The fraction of the anode volume defined by the second portion is small compared to the fraction of the anode volume defined by the first portion, such that the toed-in edge region of the first side wall provides improved interaction with the seal and the cathode assembly while retaining an increased percentage of the anode volume associated with an anode can wherein the entirety of the first side wall is associated with a full-size cross-section.

Where the overall volume of the cell is about 0.50 cm$^3$ to about 0.60 cm$^3$, at least about 98.5%, preferably at least about 99%, more preferably at least about 99.5%, most preferably at least about 99.7%, of the anode volume is retained in combination with the toed-in structure.

Where the overall volume of the cell is about 0.20 cm$^3$ to about 0.30 cm$^3$, at least about 98%, preferably at least about 98.5%, more preferably at least about 99%, most preferably at least about 99.5%, of the anode volume is retained in combination with the toed-in structure.

Where the overall volume of the cell is about 0.12 cm$^3$ to about 0.20 cm$^3$, at least about 97%, preferably at least about 98%, more preferably at least about 99%, most preferably at least about 99.3%, of the anode volume is retained in combination with the toed-in structure.

Where the overall volume of the cell is about 0.06 cm$^3$ to about 0.12 cm$^3$, at least about 96%, preferably at least about 97%, more preferably at least about 98%, still more preferably at least about 99%, and most preferably at least about 99.2%, of the anode volume is retained in combination with the toed-in structure.

In preferred embodiments, the anode can is fabricated in a forming process utilizing at least one forming die. In a finished anode can, the material of the first side wall at and proximate the inner surface as the anode can is incorporated into the cell corresponds in thickness and composition to the material of the first side wall at and proximate the inner surface of the anode can as fabricated in the forming process.

In some embodiments, the outer surface at the edge region is displaced inwardly a distance less than the thickness of the first side wall.

In preferred embodiments, the first outer surface at the edge region is displaced inwardly a distance of about 0.025 mm (0.001 inch) to about 0.203 mm (0.008 inch), preferably about 0.038 mm (0.0015 inch) to about 0.15 mm (0.006 inch).

In preferred embodiments, the thickness of the side wall structure, between inner and outer surfaces thereof, is about 0.075 mm (0.003 inch) to about 0.250 mm (0.010 inch), preferably about 0.090 mm (0.0035 inch) to about 0.150 mm (0.006 inch), more preferably about 0.114 mm (0.0045 inch) to about 0.140 mm (0.0055 inch).

Preferably, the structure of the first side wall comprises a first surface layer comprising nickel, a second opposing surface layer comprising copper, and a third substrate layer, preferably stainless steel, between the first and second surface layers.

It is preferred that the outer surface of the first side wall at the edge region be displaced inwardly of an intermediate region of the first side wall, between the top wall and the edge region, a distance less than the thickness of the first side wall.

In highly preferred embodiments, the first side wall follows a path from the intermediate region of the first side wall to a distal edge thereof wherein no element of the path is directed toward the top wall.

In preferred embodiments, the thickness of the first side wall at the edge region corresponds generally to the thickness of the side wall at the intermediate region.

The invention further comprehends methods of making a metal anode can for use in a button cell assembly. The method comprises the steps of fabricating a metal structure into a metal cup-shaped anode can precursor. The precursor has a top wall, a side wall depending downwardly from the top wall to a distal edge region thereof, the side wall having an intermediate region between the top wall and the distal edge region.

The method further includes the step of urging the distal edge region of the precursor inwardly and thereby permanently displacing the edge region inwardly of the intermediate region, preferably against an internal mandrel, and thereby making the anode can, separate from any assembling of the anode can into a button cell assembly.

BRIEF DESCRIPTION OF THE DRAWINGS

FIG. 2 shows a button cell of the invention wherein the edge region of the anode can is toed-in.

The invention is not limited in its application to the details of construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 1:
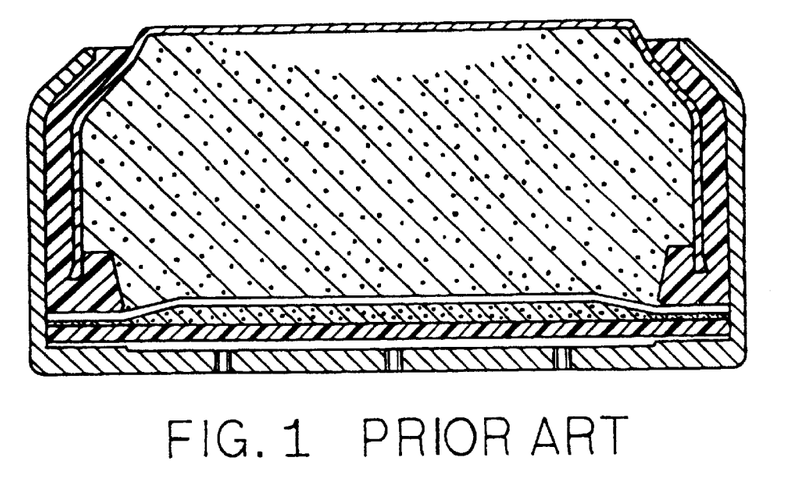
FIG. 1 shows a prior art button cell wherein the edge region of the anode can extends generally straight downward from the intermediate region.
Figure 2:
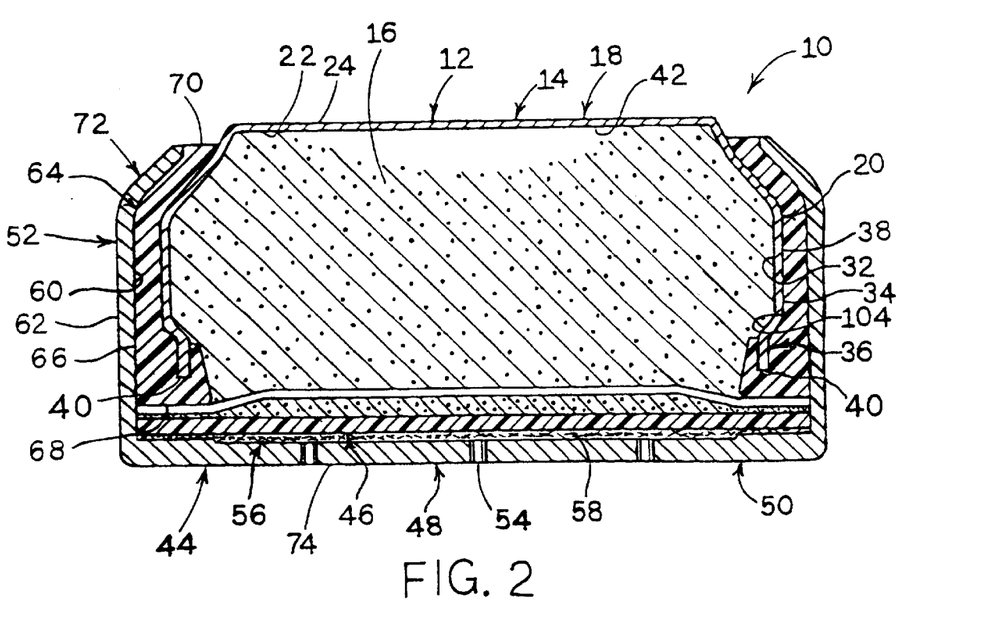

Referring now by characters of reference to the drawings, a comparison of FIGS. 1 and 2 illustrates the general concept of the invention. Referring first to FIG. 2, and specifically to the cell 10, the negative electrode 12, also referred to as the anode 12, includes an anode can 14 and electrochemically reactive anode material 16 contained therein.

Anode can 14 has a top wall 18, and circumferential downwardly-depending side wall 20. Top wall 18 includes an inner surface 22 and an outer surface 24. Side wall 20 has an inner surface 32 and an outer surface 34. Side wall 20 includes an edge region 36 remote from top wall 18, and an intermediate region 38 between edge region 36 and top wall 18. Edge region 36 further includes distal edge 40, and correspondingly terminates at distal edge 40, which is located at the bottom edge of side wall 20. Top wall 18 and side wall 20 generally define a cavity 42, defining an anode volume, within the anode can, which cavity 42 contains the anode material 16.

Positive electrode 44, also referred to as the cathode 44, includes a cathode assembly 46, contained within cathode can 48. Cathode can 48 has a bottom 50, and a circumferential upstanding side wall 52 extending upwardly from bottom 50. A plurality of air ports 54 extend through bottom 50 of the cathode can, providing avenues for transport of oxygen into the cell adjacent cathode assembly 46. An air reservoir 56 spaces cathode assembly 46 from bottom 50 and the corresponding port or ports 54. A porous diffusion layer 58 fills air reservoir 56. Side wall 52 of the cathode can has an inner surface 60 and an outer surface 62.

Anode 12 is electrically insulated from cathode 44 by seal 64. Seal 64 includes a generally cylindrical, circumferential side wall 66 disposed between upwardly extending side wall 52 of the cathode can and downwardly-depending side wall 20 of the anode can, a seal foot 68 disposed generally between distal edge 40 of the anode can and cathode assembly 46, and a seal top 70 where side wall 66 of seal 64 extends from between side walls 20 and 52 adjacent the top of the cell.

Outer surface 72 of cell 10 is thus defined by outer surface 24 of top wall 18 of the anode can, outer surface 62 of side wall 52 of the cathode can, outer surface 74 of bottom 50 of the cathode can, and top 70 of seal 64.

Figure 3:
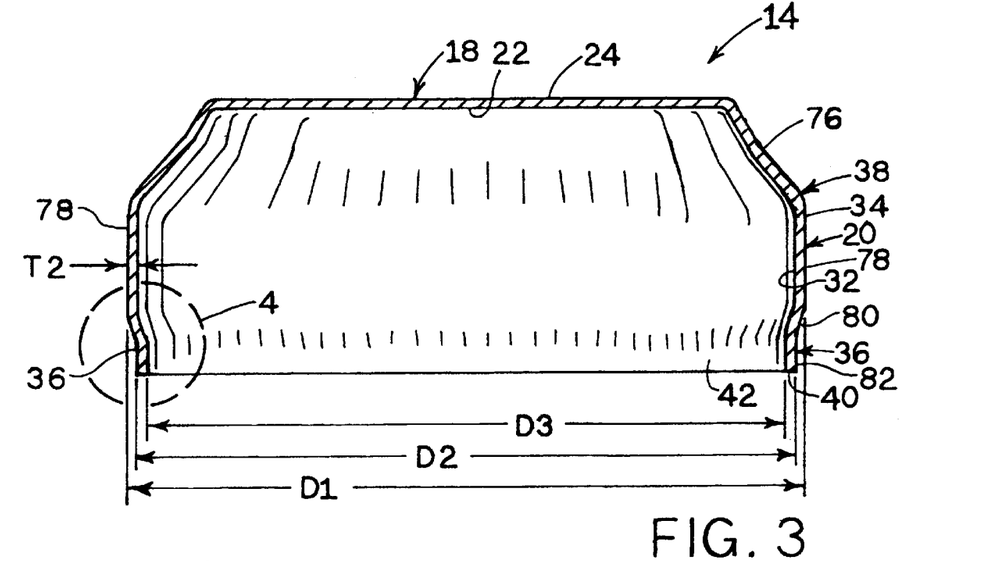
FIG. 3 shows an anode can of the invention having a toed-in edge region, and as used to make the button cell of FIG. 2.
Figure 4:
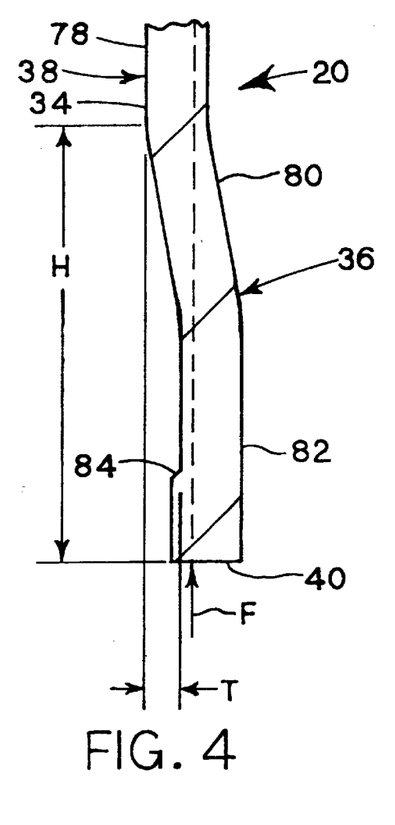
FIG. 4 shows a fragmentary enlarged view of the edge region of the anode can of FIG. 3, and is taken in FIG. 3 at the dashed circle "4."

Addressing a more detailed description of certain ones of the elements, and referring now to FIGS. 3 and 4, side wall 20 depends generally downwardly from top wall 18, and terminates in distal edge 40. Side wall 20 generally comprises two regions, namely edge region 36 remote from top wall 18, and intermediate region 38 which is disposed between edge region 36 and top wall 18.

As illustrated, intermediate region 38 includes an expanding element 76, and a maximum perimeter element 78, depicted as a maximum circumference element. Expanding element 76 extends from top wall 18 along a path of generally expanding perimeter to the locus on side wall 20 where the perimeter/circumference of the side wall generally reaches its maximum dimension, at element 78. Maximum perimeter element 78 thus extends from expanding element 76 to edge region 36.

Edge region 36 is generally defined as that portion of side wall 20 which is displaced inwardly from the maximum dimension of the side wall at maximum perimeter element 78. Thus, edge region 36, as illustrated, includes an inwardly extending abutment element 80, extending inwardly toward the interior of the anode can, and a constant circumference element 82 including distal edge 40.

Constant circumference element 82 has a generally constant inner circumference extending along a path between inwardly extending abutment element 80 and distal edge 40. The outer circumference of constant circumference element 82 includes a small step 84 therein, representing the typical clearance edge provided for cutting such anode can from a strip of such cans without marking, scratching, or otherwise damaging outer surface 34 of side wall 20 in the process of so cutting the anode can from the strip.

The cells illustrated in the drawings represent round button cells. The amount of toe-in, namely the difference between the diameter "D1" at the maximum outer diameter of the anode can in the intermediate region and the toed-in outer diameter "D2" at the constant circumference portion of the edge region is typically about 0.025 mm (0.001 inch) to about 0.203 mm (0.008 inch). Preferred toe-in amount ranges from a displacement of about 0.038 mm (0.0015 inch) inwardly from the outer surface of intermediate region 38, all around the anode can, such that outer diameter "D2" of the anode can at constant circumference element 82 is less than the outer diameter "D1" at the intermediate region by about 0.076 mm (0.003 inch), to a displacement of about 0.102 mm (0.004 inch) inwardly from the outer surface of intermediate region 38, all around the anode can, such that outer diameter "D2" of the anode can at constant circumference element 82 is less than outer diameter "D1" at the intermediate region by about 0.204 mm (0.008 inch).

In some embodiments, the preferred amount of toe-in "T" is less than thickness "T1" (See FIG. 7) of the metal structure at side wall 20. Where the amount of toe-in is less than the thickness "T1," a Force "F" directed against the bottom of the cathode can at a perpendicular angle, and thence upwardly into seal foot 68 and side wall 20, can pass from distal edge 40 directly upwardly through edge region 36 and into maximum perimeter section 78 of intermediate region 38, all in a straight line aligned with the Normally-directed force on the bottom of the cathode can, and all within the thickness "T1" of the metal structure. The straight-line path of transmission of force "F" in side wall 20 is illustrated in FIG. 4.

Where the amount of toe-in "T" is consistent with straight line alignment of forces from the bottom of cell 10 to intermediate region 38 of the side wall, the straight line transmission of forces enables use of thinner materials for making anode can side wall 20, without failure of the anode can during cell assembly. Such thinner side walls range from a thickness of about 0.075 mm (0.003 inch) to about 0.250 mm (0.010 inch) between inner surface 32 to outer surface 34. Preferred thickness is from about 0.090 mm (0.0035 inch) to about 0.150 mm (0.006 inch), more preferably from about 0.114 mm (0.0045 inch) to about 0.140 mm (0.0055 inch).

In general, side wall 20 follows a path from top wall 18 to distal edge 40 wherein no element of the path is directed toward top wall 18. Thus, no element of the side wall represents a reverse curl of the structure used to make side wall 20.

Referring to the embodiment represented by FIGS. 2–4, the toed-in edge region 36 provides measurably-enhanced hoop strength to the anode can, in spite of the fact that no portion of side wall 20 is directed toward top wall 20, and no portion of side wall 20 incorporates multiple layers of the side wall structure therein. While choosing to not be bound by theory, nor by any speculation not based on data, applicant contemplates that the modestly transversely directed abutment element 80 makes a significant contribution to the increased hoop strength exhibited by anode cans of the embodiment of FIGS. 2–4.

Figure 7:
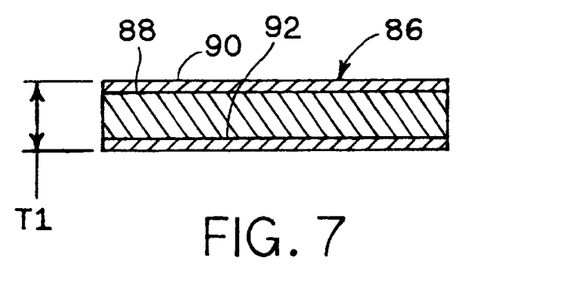
FIG. 7 shows a representative cross-section of metal sheet structure useful in making anode cans of the invention.

In general, anode can 12 is fabricated from a strip of metal 86 having a multiple layer structure, generally as illustrated in FIG. 7. Anode can 12 is readily formed from e.g. a three layer structure 86 having a substrate core layer 88 of e.g. 304 stainless steel clad with a layer 90 of copper which is used for the inner surface of the anode can, and a layer of nickel 92 on the opposing surface of the stainless steel, the nickel being used for the outer surface of the anode can. In some embodiments, it is contemplated that additional layers may be used, as desired, between the stainless steel layer and the copper layer, and/or between the stainless steel layer and the nickel layer.

In conventional metal strip material used to make anode cans, about 76 percent by volume of the metal structure is contained in the substrate layer 88 of stainless steel. About 16 percent by volume is contained in the surface copper layer 90. About 8 percent by volume is contained in the surface nickel layer 92. Accordingly, with all expressions being percent by volume represented by the respective layers, the structure can be expressed, layer for layer, as /16% Cu/76% SS/8% Ni/.

"Cu" is copper. "SS" is stainless steel. "Ni" is nickel. All expressions are percent by volume.

The strength of the above metal strip structure is provided by a combination of (a) the thickness of the structure, and (b) the combined strengths of the materials in the individual layers. Regarding materials, the stainless steel provides proportionately more structural strength for equal volumes of material, than the copper or the nickel. The fraction of the metal strip comprising the stainless steel layer can be increased, thus providing greater strength per unit of thickness, while maintaining suitable forming properties for forming anode cans and reducing the overall thickness of the three-layer metal structure.

Thus, a three-layer structure of the above nature, having the combination of suitable forming properties along with sufficient strength, stiffness, and crush resistance in the anode can, can be made into anode cans when the relative amounts of the layers 88, 90, and 92 are revised to increase the relative amount of the stainless steel layer 88. The following structures illustrate that the amount of stainless steel can be increased by up to about 20% over conventional structures, from 76% stainless steel to about 91% stainless steel. Exemplary such structures are:

/16% Cu/82% SS/2% Ni/

/7% Cu/91% SS/2% Ni/

The above two structures of metal strip 86, for making anode cans of the invention, are merely illustrative of structures within the range of structures which can be used wherein the common feature is the increase in the amount of the substrate stainless steel layer relative to the amount of the copper and/or the nickel layers. Accordingly, the volume of the copper layer can range from about 7% to about 16% of the volume of the three-layer metal structure, and the volume of the nickel layer can range from about 2% to about 7% of the volume of the three-layer metal structure. So long as the stainless steel content is increased above the conventionally known level of about 76%, the strength of the metal structure 86, for any given thickness, is improved. Thus, the metal structure 86 allows for reduction in thickness of the structure while maintaining the strength of the anode can.

Preferred steps in the development of structures having increasing amounts of the stainless steel layer, and thus higher strength/thickness ratio, produce anode cans having progressively, for example, 77% stainless steel, 80% stainless steel, 83% stainless steel, 87% stainless steel, and 91% stainless steel, with respective 20%, 17%, 13%, and 9% as the corresponding combined amounts of the copper and nickel layers 90 and 92. Preferred steps in development of metal structures 86 having decreasing amounts of the copper layer 90 are, for example, 15% copper, 11% copper, and 7% copper. Preferred steps in development of structures having decreasing amounts of the nickel layer 92 are, for example, 7% nickel, 6% nickel, 3% nickel, and 2% nickel. The full range of the structures described can be obtained from Sumitomo Metals Company, Japan.

In general, anode can precursors for making anode cans of the invention are made in a conventional manner. Using conventional multiple-stage cold forming press tooling, cup-shaped, anode can precursors, which correspond to conventional non-toed-in anode cans, are formed in the usual manner.

Figure 5:
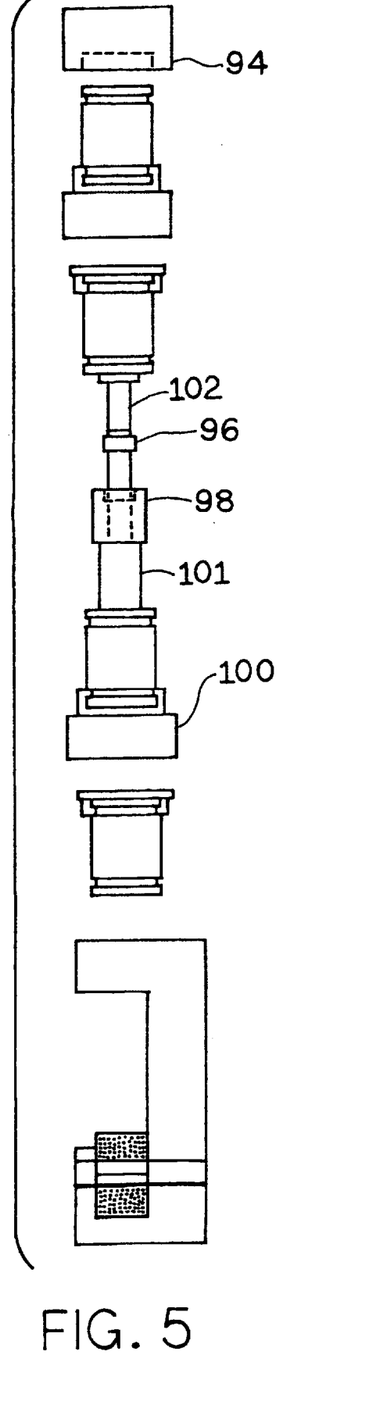
FIG. 5 shows a side elevation of an exploded representation of a press assembly useful for toeing-in the edge region of an anode can of the invention.
Figure 6:
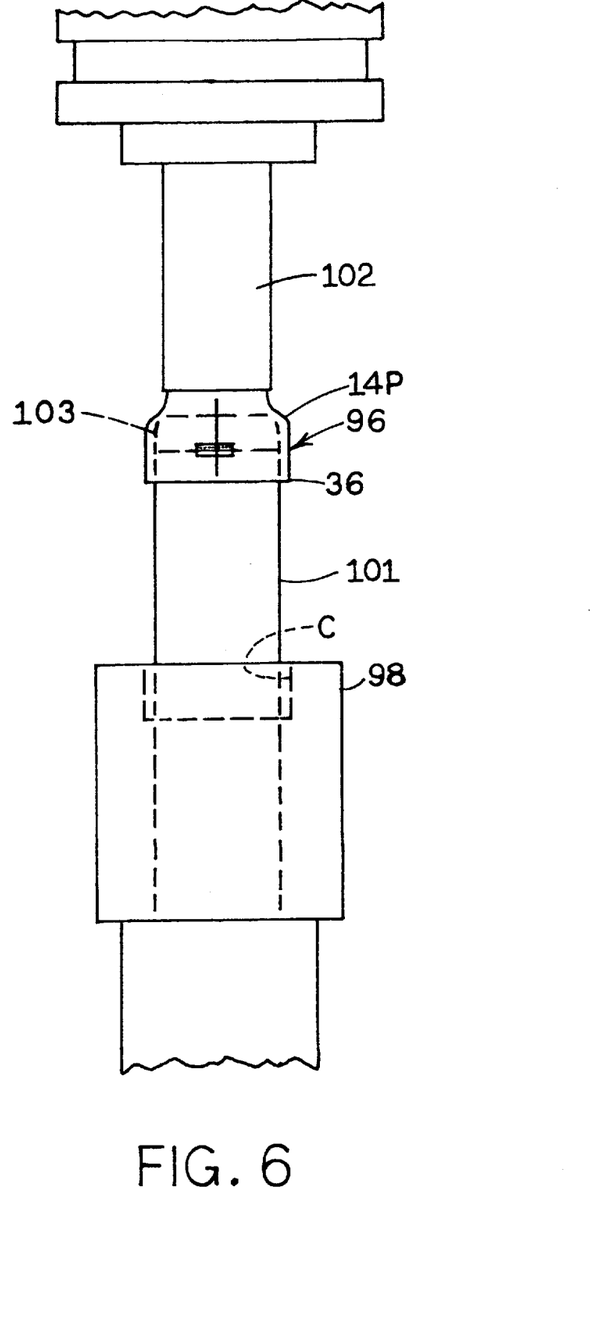
FIG. 6 shows an enlarged portion of the press assembly of FIG. 5.

The novel toed-in anode cans of the invention can be made by performing additional processing steps on such conventional anode cans. As illustrated in FIGS. 5 and 6, such conventional can is mounted in a generally conventional forming press. Such press includes a setting collar 94, an anode can pocket 96, a die pocket 98, and a setting collar 100.

FIG. 6 shows an enlarged view of anode can pocket 96 and die pocket 98. In operation, an anode can precursor 14P is mounted on upwardly extending support 101, between support 101 and downwardly extending ram 102. Specifically, anode can precursor 14P is held by expanding male mandrel 103. Ram 102 is activated against the supporting and controlling resistance of support 101, moving precursor 14P and mandrel 103 downwardly together into die pocket 98. As precursor 14P and mandrel 103 are together urged into die pocket 98, edge region 36 engages the side walls of cavity "C" of the die pocket, with the result that the side walls of the die pocket form the edge region inwardly against the spaced support provided by now-expanded male mandrel 103, permanently displacing the edge region inwardly in the toed-in configuration against male mandrel 103.

Height "H" (see FIG. 4) of the edge region, between distal edge 40 and intermediate region 38 is controlled by controlling the distance by which distal edge 40 penetrates into die pocket 98. Thus for a greater height "H," distal edge 40 is transported further into die pocket 98. For a lesser height "H," distal edge is transported a lesser distance into die pocket 98.

In accord with the above process for forming edge region 36, the edge region is fabricated with only limited sheer stress between copper layer 90 and male mandrel 103. Accordingly, copper layer 90 remains effectively imposed between anode material 16 and stainless steel layer 88, after the toeing in of edge region 36. Thus, no post-fabrication layer of other coating need be applied to the copper layer, whereby the material of side wall structure 86 at and proximate inner surface 32, as the anode can is incorporated into cell 10 at cell assembly, corresponds in thickness and composition to the material of the side wall at and proximate surface 32 at the conclusion of the fabrication of the toed-in edge region.

While structure 86 of edge region 36 may have some inward or outward curl between inwardly extending abutment element 80 and distal edge 40, such inward or outward curl is not preferred, and should in any event be confined inwardly of the maximum diameter "D1," and the thickness "T2" should be less than two times "T1," e.g. no more than about 1.5 times "T1," preferably about equal to "T1." Thus, the outer surface of constant diameter element 82 of edge region 36 should be recessed from outer surface 34 as the outer surface is defined at intermediate element 38. Accordingly, an outward "reverse curl," having an outer diameter flush with diameter "D1," as illustrated in U.S. Pat. No. 5,576,117 is not contemplated to be within the scope of the invention.

Figure 8:
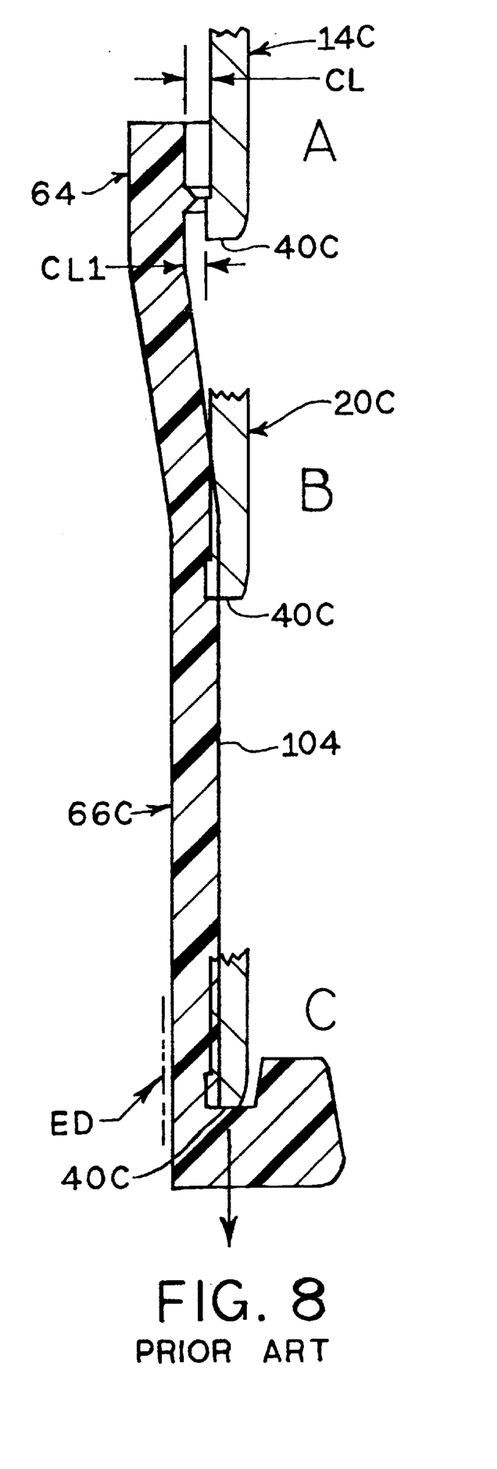
FIG. 8 is a fragmentary cross-section showing prior art assembly steps, for assembling an electrochemical cell, in which steps a side wall of the seal is assembled with a prior art anode can at the side wall of the anode can.
Figure 9:
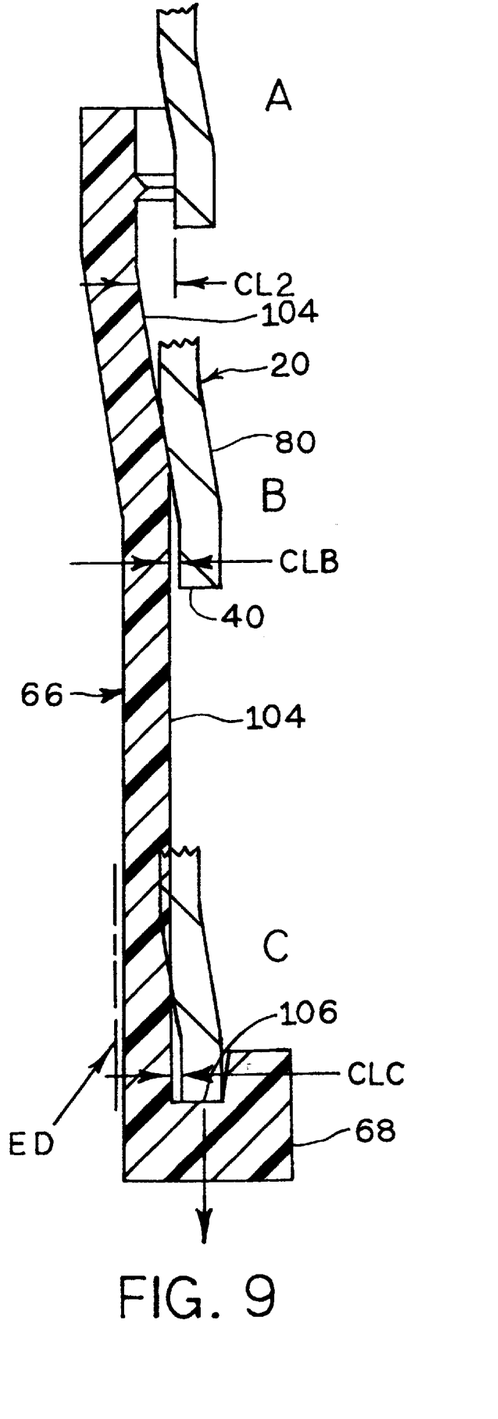
FIG. 9 is a fragmentary cross-section showing assembly steps of the invention, for assembling an electrochemical cell, in which steps a side wall of the seal is assembled with an anode can of the invention at the side wall of the anode can.

As suggested by the discussion of FIGS. 8 and 9 following, and elsewhere, toeing-in at least the leading (distal) edge 40 of the edge region at outer surface 34, inwardly of maximum diameter "D1," is important in spacing outer surface 34 of side wall 20 of the anode can, at distal edge 40, away from inner surface 104 of side wall 66 of seal 64 during assembly of the anode can and the seal.

A short description of the use of anode cans of the invention illustrates the value of the toed-in feature to electrochemical cells of the invention. In assembling the various elements of a button cell to form a cell, in general, the anode and cathode are assembled separately as separate subassemblies. Then the anode and cathode are brought together in a cell assembly process wherein the anode material and electrolyte are added to the anode shortly before bringing the anode and the cathode together in final assembly and closure of the cell.

The creation of the cathode is conventional and thus bears no further discussion regarding novelty of the invention herein.

In creation of the anode, anode can 14 is assembled to seal 64 to make an anode subassembly. Proper assembly of anode can 14 and seal 64 requires a close and interfering fit between anode can 14 and seal 64. Such close and interfering fit is required in order to ensure eventual creation of such a good sealing of the cell made therewith that leakage of electrolyte from the cell is avoided.

The toe-in described herein provides continuous clearance between constant circumference element 82, including distal edge 40, and side wall 66 of seal 64 throughout the process of assembling anode can 12 and seal 64 to each other to form the anode subassembly. Referring to FIG. 8, a conventional anode can 14C is illustrated in three Stages "A," "B," and "C" of being joined with a seal 64 to make the anode subassembly. As seen in FIG. 8, as the distal edge 40C of the anode can enters the seal 64 in Stage "A" at the top of side wall 66, there is a clearance "CL1" between distal edge 40C of the can and inner surface 104 of side wall 64.

As the anode can progresses inwardly into seal 64 toward Stage "B," distal edge 40C progresses correspondingly along inner surface 104 of side wall 66. At Stage "B," the diameter of the seal 64 is smaller than at Stage "A," such that the relaxed inner diameter of the seal at Stage "B" is smaller than the outer diameter of the anode can at distal edge 40C, creating an initial interference condition. The interference condition is resolved primarily by resilient expansion of seal 64 by outward deflection of side wall 66 in response to the force applied by advancing abutment element 80.

As indicated above, such interference is desirable for purposes of creating a leak-proof seal against leakage of electrolyte from the cell into which the anode subassembly is to be assembled. However, such interference is simultaneously undesirable because of the accompanying risks of damaging seal 64 in the process of assembling the anode can and the seal to each other, accompanied by ongoing sliding interference of distal edge 40C along inner surface 104 of side wall 66.

Between Stages "B" and "C," the relaxed inner diameter of the seal remains relatively constant such that as distal edge 40C advances along inner surface 104 of side wall 66, side wall 20C of the anode can exerts a constant pressure, at leading distal edge 40C, against inner surface 104 of side wall 66. Such constant pressure against side wall 66 as the distal edge progresses from Stage "B" to Stage "C" includes the ongoing risk of damaging/cutting side wall 66 at locations along the surface of the entire circumference of side wall 66 for the distance between Stages "B" and "C."

Notably, distal edge 40C is the distal edge of a thin piece of metal e.g. about 0.075 mm (0.003 inch) to about 0.250 mm (0.010 inch) thick, and can thus operate like a knife edge to cut into or through side wall 104. Especially any burr or other deformity, irregularity, or other imperfection, at distal edge 40C can be readily and inadvertently applied to side wall 66 as the distal edge advances toward Stage "C." To the extent side wall 66 is cut or otherwise damaged, the risk of leakage of electrolyte from any cell made therewith is correspondingly increased.

Referring now to FIG. 9, for sake of the instant discussion, the anode can in FIG. 9 is identical to the anode can in FIG. 8 except that the in-line edge region and accompanying distal edge 40 are toed-in by 0.102 mm (0.004 inch). Seal 64 is the same as in FIG. 8. Thus, the clearance "CL2" between distal edge 40 and inner surface 104 of side wall 66 at the top of seal 64 is 0.102 mm (0.004 inch) greater in FIG. 9 than in FIG. 8, which increase is generally illustrated at Stage "A."

At Stage "B," the diameter of the seal 64 is smaller than at Stage "A," such that the inner diameter of the seal at Stage "B" is smaller than the greatest diameter of side wall 20. Further at Stage "B," the circumferential outer surface of abutment element 80 of edge region 36, above distal edge 40, and approximately at the joinder of abutment element 80 and intermediate element 38, is in abutment with inner surface 104 of side wall 66. Such surface-to-surface abutment, away from distal edge 40, runs far less risk, namely substantially no risk, of damaging side wall 66, especially as compared to the risk of damage at leading edge 40C in FIG. 8.

Since abutment element 80 provides surface-to-surface abutment at its greater diameter spaced from, but in close proximity to, distal edge 40, the portion of side wall 66 directly adjacent constant circumference element 82, and distal edge 40, is progressively expanded, in combination with advance of side wall 20, to a diameter greater than the diameter of constant circumference element 82 and distal edge 40 as edge region 36 progresses to Stage "B" and from Stage "B" to Stage "C." Thus, side wall 20, through abutment element 80, progressively expands seal side wall 66, preferably ahead of distal edge 40, preferably maintaining a respectively progressing clearance between constant circumference element 82, including distal edge 40, and inner surface 104.

In both FIGS. 8 and 9, Stage "C" shows the unexpanded diameter of side wall 66 in solid outline, indicating the potential interference at constant circumference element 82, and the expanded inner and outer diameters "ED" in dashed outline, in order to clearly illustrate the interference between side wall 66 of the seal and side wall 20 of the anode can. However, contrary to prior art FIG. 8, in anode cans of the invention as illustrated in FIG. 9, distal edge 40 is generally free from, and spaced from, inner surface 104 of side wall 66 along the entirety of the path of advance of distal edge 40 along the inner surface of side wall 66, from the top edge of the side wall to its seating in groove 106 at foot 68.

At Stage "B," the distal edge 40C of the conventional anode can is in interfering contact with side wall 66C, while there remains a small clearance "CLB" between constant circumference element 82, including distal edge 40, of the anode can of the invention and inner surface 104 of side wall 66. At Stage "C," the distal edge 40C of the conventional anode can remains in interfering contact with side wall 66C, while there remains a clearance "CLC" between constant circumference element 82 of the anode can of the invention and inner surface 104.

In accommodation of the toed-in design of the anode can herein, the inner diameter of seal 64 at foot 68, and the diameters of groove 106, are adjusted inwardly an amount similar to the amount of the toeing-in. Thus, for example, where the diameter of the anode can at the distal edge has been toed in by 0.203 mm (0.008 inch), the minimum diameter of the seal at foot 68 is reduced by about 0.203 mm (0.008 inch) and the diameter of groove 106 is correspondingly reduced. Thus, as illustrated in FIGS. 8 and 9, the toed-in design reduces the probability of distal edge 40 damaging side wall 66 as the anode can is assembled to seal 64.

An additional benefit of the toed-in design resides in an interaction between anode can 14 at distal edge 40, through seal 64, with cathode assembly 46. As illustrated in FIGS. 1 and 2, cathode assembly 46 is conventionally compressed to some degree between seal foot 68 and bottom 50 of the cathode can when the cell is assembled. Namely, the force urging the anode can and the cathode can together during cell assembly, is partially dissipated in compressing cathode assembly 46. As such force is applied to, and dissipated in, cathode assembly 46, the cathode assembly responds by "doming."

By "doming" is meant that the portion of the cathode assembly which is disposed inwardly of seal foot 68 is displaced slightly from a parallel orientation away from bottom 50 of the cathode can and toward top wall 18 of the anode can. While some such displacement is desirable in accommodating proper dimensioning of air reservoir 56, all such displacement is an intrusion into the anode volume which is to contain the electrochemically reactive anode material. To the extent the dimension of the dome is greater than needed for proper formation of the air reservoir, the dome inappropriately occupies excess volume which is preferably occupied by anode material. Where the quantity of anode material is thus limited, so is the use life of the cell respectively limited.

Applicants have discovered that even the minor reduction in diameter of the anode can at distal edge 40, as accorded by the toed-in edge region herein, provides improved control of the doming of the cathode assembly, whereby characteristic properties of cells made with such anode cans are more controllable and more predictable.

Further, applicants have discovered that the toed-in structure provides substantial additional "hoop" strength to the anode can at distal edge 40, even when no portion of the edge regions in cans so tested had any 90 degree or greater turn, and no such anode can had a reverse curl in the respective side wall.

Figure 10:
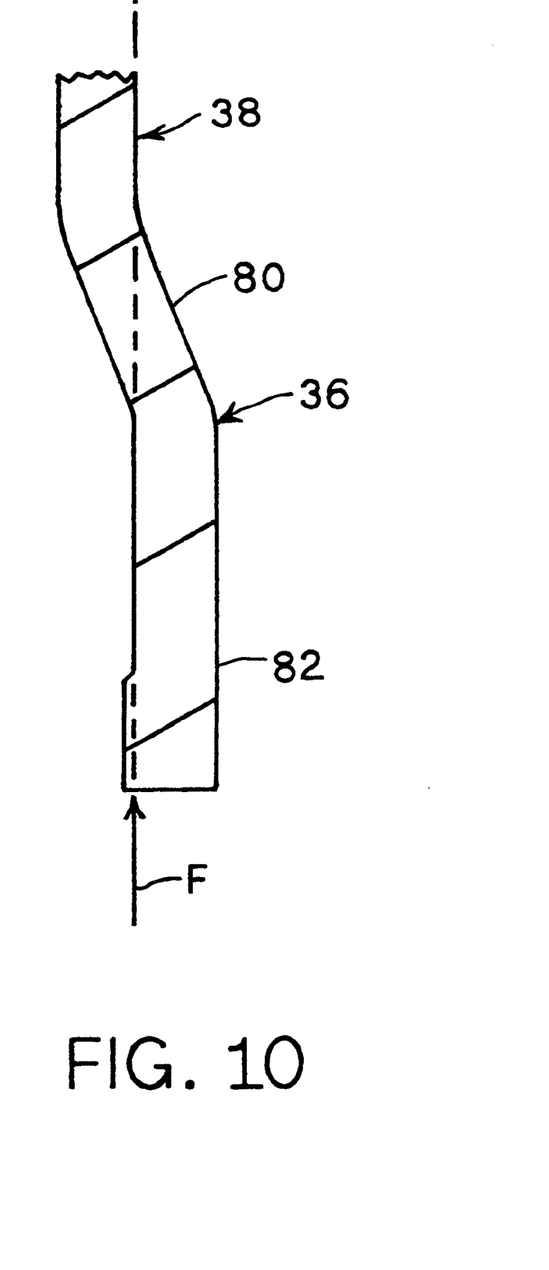
FIGS. 10 and 11 show fragmentary enlarged views, as in FIG. 4, of alternate embodiments of the edge region of the anode can.
Figure 11:
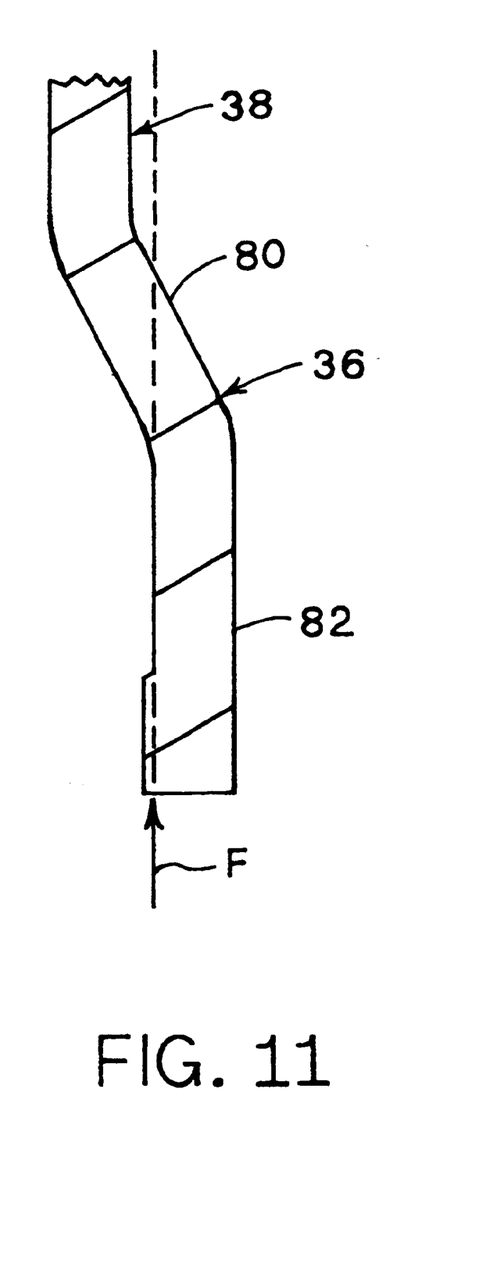

Applicants have further discovered that the amount of toe-in ("D1" minus "D2") directly affects the amount of doming. Thus, for given cell assembly conditions, doming can be reduced by increasing the amount of toe-in. FIG. 10 illustrates an anode can wherein edge region 36 has been toed-in by an amount substantially equal to the thickness of the side wall. FIG. 11 illustrates an anode can wherein edge region 36 has been toed-in by more than the thickness of the side wall. For given cell assembly conditions, the amount of toe-in illustrated in FIG. 11 generally requires a greater thickness of side wall 20 than where the amount of toe-in is less such as in FIG. 10, and especially as in FIG. 9.

Increasing the amount of toe-in "T" provides at least two advantages. First, increasing the amount of toe-in facilitates assembling the anode can to the seal as illustrated in FIGS. 8 and 9. Second, increasing the amount of toe-in provides improved control over doming of the cathode assembly when the cell elements are brought together in assembly and closure of the cell.

However, increasing the amount of the toe-in also suggests at least two disadvantages. The greater the amount of toe-in, the more edge region 36 intrudes into what would otherwise be a larger volume in anode can 14 available to receive the electrochemically reactive anode material. As the amount of anode material is reduced, the use life of the cell is respectively, and undesirably, reduced.

Further, the greater the amount of toe-in, the greater the effect of force "F" on side wall 20. Thus, where the amount of toe-in is greater than the thickness "T1" of the side wall, generally a greater thickness "T1" is required to support the toed-in structure. The greater thickness "T1" again undesirably reduces the anode volume.

Table 1 illustrates the percentage of anode volume lost when the anode can, thickness "T1" of side wall 20 equal 0.152 mm (0.006 inch), is toed-in all around in amounts of about 0.038 mm (0.0015 inch) and about 0.150 mm (0.006 inch). The corresponding reductions in outer diameter at the edge regions were about double the above amounts, namely 0.076 mm (0.003 inch) and 0.300 mm (0.012 inch). Height "H" was about 0.86 mm (0.034 inch).

TABLE 1

| PERCENT ANODE VOLUME CHANGE | | | | | |
|---|---|---|---|---|---|
| Cell Outer Diameter | Cell Height | .038 mm(.0015 inch) Toe-In "T" | | .150 mm(.006 inch) Toe-In "T" | |
| mm(inch) | mm(inch) | % Loss | % Retained | % Loss | % Retained |
| 5.72(.225) | 3.43(.135) | .74% | 99.26% | 2.88% | 97.12% |
| 7.75(.305) | 3.43(.135) | .56% | 99.44% | 2.22% | 97.78% |
| 7.75(.305) | 5.26(.207) | .35% | 99.65% | 1.39% | 98.61% |
| 11.5(.454) | 5.26(.207) | .23% | 99.77% | 0.92% | 99.08% |

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. An electrochemical cell, comprising:
   (a) an anode, including an anode can and electrochemically reactive anode material in said anode can, said anode can having a top wall, and a first side wall depending downwardly from said top wall, said first side wall having a first outer surface, said first side wall further having an edge region remote from said top wall;
   (b) a cathode, including a cathode can, and a cathode assembly in said cathode can, said cathode can having a bottom wall, and a second side wall extending upwardly from said bottom wall, said second side wall having a first inner surface,
   said first side wall of said anode can being received inside said second side wall of said cathode can, said first outer surface at said edge region being displaced inwardly of said first outer surface as defined at locations away from said edge region; and
   (c) a seal between said anode can and said cathode can at said first and second side walls.

2. An electrochemical cell as in claim 1 wherein clearance between said first and second side walls at said edge region is greater than clearance between said first and second side walls at locations away from said edge region.

3. An electrochemical cell as in claim 1, said first side wall having an intermediate region associated with a first full-size cross-section portion of said anode can, between said top wall and said edge region, said edge region providing a second reduced-size cross-section portion of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.50 cm$^3$ to about 0.60 cm$^3$, an anode volume being defined inwardly of said first side wall, the fraction of the anode volume defined by said second portion being small compared to the fraction of the anode volume defined by said first portion, said toed-in edge region of said first side wall providing improved interaction with said seal and said cathode assembly while retaining at least 98.5% of the anode volume associated with a corresponding anode can wherein the entireties of both said intermediate region and said edge region of said first side wall are associated with full-size cross-sections.

4. An electrochemical cell as in claim 3 wherein said toed-in edge region of said first side wall provides improved interaction with said seal and said cathode assembly while retaining at least 99.5% of the anode volume associated with a corresponding anode can wherein the entireties of both said intermediate region and said edge region of said first side wall are associated with full-size cross-sections.

5. An electrochemical cell as in claim 1, said first side wall having an intermediate region associated with a first full-size cross-section portion of said anode can, between said top wall and said edge region, said edge region providing a second reduced-size cross-section portion of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.20 cm$^3$ to about 0.30 cm$^3$, an anode volume being defined inwardly of said first side wall, the fraction of the anode volume defined by said second portion being small compared to the fraction of the anode volume defined by said first portion, said toed-in edge region of said first side wall providing improved interaction with said seal and said cathode assembly while retaining at least 98% of the anode volume associated with a corresponding anode can wherein the entireties of both said intermediate region and said edge region of said first side wall are associated with full-size cross-sections.

6. An electrochemical cell as in claim 5 wherein said toed-in edge region of said first side wall provides improved interaction with said seal and said cathode assembly while retaining at least 99% of the anode volume associated with a corresponding anode can wherein the entireties of both said intermediate region and said edge region of said first side wall are associated with full-size cross-sections.

7. An electrochemical cell as in claim 1, said first side wall having an intermediate region associated with a first full-size cross-section portion of said anode can, between said top wall and said edge region, said edge region providing a second reduced-size cross-section portion of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.12 cm$^3$ to about 0.20 cm$^3$, an anode volume being defined inwardly of said first side wall, the fraction of the anode volume defined by said second portion being small compared to the fraction of the anode volume defined by said first portion, said toed-in edge region of said first side wall providing improved interaction with said seal and said cathode assembly while retaining at least 97% of the anode volume associated with a corresponding anode can wherein the entireties of both said intermediate region and said edge region of said first side wall are associated with full-size cross-sections.

8. An electrochemical cell as in claim 7 wherein said toed-in edge region of said first side wall provides improved interaction with said seal and said cathode assembly while retaining at least 99% of the anode volume associated with a corresponding anode can wherein the entireties of both said intermediate region and said edge region of said first side wall are associated with full-size cross-sections.

9. An electrochemical cell as in claim 1, said first side wall having an intermediate region associated with a first full-size cross-section portion of said anode can, between said top wall and said edge region, said edge region providing a second reduced-size cross-section portion of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.06 cm$^3$ to about 0.12 cm$^3$, an anode volume being defined inwardly of said first side wall, the fraction of the anode volume defined by said second portion being small compared to the fraction of the anode volume defined by said first portion, said toed-in edge region of said first side wall providing improved interaction with said seal and said cathode assembly while retaining at least 96% of the anode volume associated with a corresponding anode can wherein the entireties of both said intermediate region and said edge region of said first side wall are associated with full-size cross-sections.

10. An electrochemical cell as in claim 9 wherein said toed-in edge region of said first side wall provides improved interaction with said seal and said cathode assembly while retaining at least 98% of the anode volume associated with a corresponding anode can wherein the entireties of both said intermediate region and said edge region of said first side wall are associated with full-size cross-sections.

11. An electrochemical cell as in claim 1, said anode can having been fabricated in a forming process utilizing at least one forming die, said anode can having a second inner surface, material of said first side wall at and proximate the second inner surface of said anode can as said anode can is incorporated into said electrochemical cell corresponding in composition to material of said first side wall at and proximate the second inner surface of said anode can as fabricated in the forming process.

12. An electrochemical cell as in claim 1, said first outer surface at said edge region being displaced inwardly a distance of about 0.025 mm to about 0.203 mm.

13. An electrochemical cell as in claim 1, said first side wall having a second inner surface opposite said first outer surface, and a first side wall structure therebetween, said first side wall structure having a thickness between the opposing second inner and first outer surfaces thereof, said thickness being about 0.075 mm to about 0.250 mm.

14. An electrochemical cell as in claim 1, said first side wall having a second inner surface opposite said first outer surface, and a first side wall structure therebetween, said first side wall structure having a thickness between the opposing second inner and first outer surfaces thereof, said thickness being about 0.090 mm to about 0.150 mm.

15. An electrochemical cell as in claim 1, said first side wall having a second inner surface opposite said first outer surface, and a first side wall structure therebetween, said first side wall structure having a thickness between the opposing second inner and first outer surfaces thereof, said thickness being about 0.114 mm to about 0.140 mm.

16. An electrochemical cell as in claim 1, said first side wall having a second inner surface opposite said first outer surface, the composition of said first side wall comprising a first surface layer comprising nickel at the first outer surface, a second opposing surface layer comprising copper at the opposing second inner surface, and a third substrate layer between said first and second layers.

17. An electrochemical cell as in claim 16, said third substrate layer comprising stainless steel.

18. An electrochemical cell as in claim 1, said first side wall having a thickness, and an intermediate region between said top wall and said edge region, the first outer surface at said edge region being displaced inwardly of the first outer surface of said intermediate region a distance less than the thickness of said first side wall.

19. An electrochemical cell as in claim 1, said first side wall having a thickness, and an intermediate region between said top wall and said edge region, the first outer surface at said edge region being displaced inwardly of the first outer surface of said intermediate region a distance at least as great as the thickness of said first side wall.

20. An electrochemical cell as in claim 1, said first side wall having a thickness, and an intermediate region between said top wall and said edge region, the first outer surface at said edge region being displaced inwardly of the first outer surface of said intermediate region a distance greater than the thickness of said first side wall.

21. An electrochemical cell as in claim 1, said edge region having a distal edge remote from said top wall, said first side wall following a path from an intermediate region of said first side wall, between said top wall and said edge region, to said distal edge wherein no element of the path is directed toward said top wall.

22. An electrochemical cell as in claim 1, said first side wall comprising a second inner surface opposite the first outer surface and in contact with said electrochemically reactive anode material, the first outer surface of said first side wall representing the closest proximity of said first side wall to said second side wall at any given part of said first side wall, said first side wall comprising an intermediate region between said top wall and said edge region, thickness of said first side wall between the second inner and the first outer surfaces at said edge region corresponding to thickness of said first side wall between the second inner and the first outer surfaces at said intermediate region.

23. An electrochemical cell, comprising:
(a) an anode, including an anode can and electrochemically reactive anode material in said anode can, said anode can having a top wall, and a first side wall depending downwardly from said top wall, said first side wall having a first outer surface, said first side wall further having an edge region remote from said top wall;
(b) a cathode, including a cathode can, and a cathode assembly in said cathode can, said cathode can having a bottom wall, and a second side wall extending upwardly from said bottom wall, said second side wall having a first inner surface,
said first side wall of said anode can being received inside said second side wall of said cathode can, said first side wall including an intermediate region, between said top wall and said edge region, said first side wall at said edge region being displaced inwardly of said intermediate region and thereby being toed-in, said first side wall having an average thickness in said intermediate region, the average thickness of said first side wall between said intermediate region and a distal edge of said first side wall being less than twice the thickness of said first side wall in said intermediate region; and
(c) a seal between said anode can and said cathode can at said first and second side walls.

24. An electrochemical cell as in claim 23, said first side wall comprising a second inner surface opposite the first outer surface and in contact with said electrochemically reactive anode material, the first outer surface of said first side wall representing the closest proximity of said first side wall to said second side wall at any given part of said first side wall, the thickness of said first side wall between the second inner and first outer surfaces, from said intermediate region to said distal edge of said first side wall, being no greater than about the thickness of said first side wall in said intermediate region.

25. An electrochemical cell as in claim 23, said first side wall extending from said intermediate region to said distal edge along a path directed generally constantly away from said top wall.

26. An electrochemical cell as in claim 23, said anode can having been fabricated in a forming process utilizing at least one forming die, said anode can having a second inner surface, material of said first side wall at and proximate the second inner surface of said anode can as said anode can is incorporated into said electrochemical cell corresponding in composition to material of said first side wall at and proximate the second inner surface of said anode can as fabricated in the forming process.

27. An electrochemical cell as in claim 23, said first side wall having a thickness, said first outer surface at said edge region being displaced inwardly of the first outer surface of said intermediate region a distance less than the thickness of said first side wall.

28. An electrochemical cell as in claim 23, said first side wall having a thickness, said first outer surface at said edge region being displaced inwardly of the first outer surface of said intermediate region a distance at least as great as the thickness of said first side wall.

29. An electrochemical cell as in claim 23, said first side wall having a thickness, said first outer surface at said edge region being displaced inwardly of the first outer surface of said intermediate region a distance greater than the thickness of said first side wall.

30. An electrochemical cell as in claim 23, said first outer surface at said edge region being displaced inwardly a distance of about 0.025 mm to about 0.203 mm.

31. An electrochemical cell as in claim 23, said first side wall having a second inner surface opposite said first outer surface, and a first side wall structure therebetween, said first side wall structure having a thickness between the opposing inner and outer surfaces thereof, said thickness being about 0.075 mm to about 0.250 mm.

32. An electrochemical cell as in claim 23, said first side wall having a second inner surface opposite the first outer surface, and a first side wall structure therebetween, said first side wall structure having a thickness between the opposing second inner and first outer surfaces thereof, said thickness being about 0.090 mm to about 0.150 mm.

33. An electrochemical cell as in claim 23, said first side wall having a second inner surface opposite the first outer surface, and a first side wall structure therebetween, said first side wall structure having a thickness between the opposing second inner and first outer surfaces thereof, said thickness being about 0.114 mm to about 0.140 mm.

34. An electrochemical cell as in claim 23, said first side wall having a second inner surface opposite the first outer surface, the composition of said first side wall comprising a first surface layer comprising nickel at the first outer surface, a second surface layer comprising copper at the second opposing inner surface, and a third substrate layer between said first and second layers.

35. An electrochemical cell as in claim 34, said third substrate layer comprising stainless steel.

36. An electrochemical cell as in claim 23, said intermediate region of said first side wall being associated with a first full-size cross-section portion of said anode can, between said top wall and said edge region, said edge region providing a second reduced-size cross-section portion of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.50 cm$^3$ to about 0.60 cm$^3$, an anode volume being defined inwardly of said first side wall, the fraction of the anode volume defined by said second portion being small compared to the fraction of the anode volume defined by said first portion, said toed-in edge region of said first side wall providing improved interaction with said seal and said cathode assembly while retaining at least 98.5% of the anode volume associated with a corresponding anode can wherein the entireties of both said intermediate region and said edge region of said first side wall are associated with full-size cross-sections.

37. An electrochemical cell as in claim 36 wherein said toed-in edge region of said first side wall provides improved interaction with said seal and said cathode assembly while retaining at least 99.5% of the anode volume associated with a corresponding anode can wherein the entireties of both said intermediate region and said edge region of said first side wall are associated with full-size cross-sections.

38. An electrochemical cell as in claim 23, said intermediate region of said first side wall being associated with a first full-size cross-section portion of said anode can, between said top wall and said edge region, said edge region providing a second reduced-size cross-section portion of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.20 cm$^3$ to about 0.30 cm$^3$, an anode volume being defined inwardly of said first side wall, the fraction of the anode volume defined by said second portion being small compared to the fraction of the anode volume defined by said first portion, said toed-in edge region of said first side wall providing improved interaction with said seal and said cathode assembly while retaining at least 98% of the anode volume associated with a corresponding anode can wherein the entireties of both said intermediate region and said edge region of said first side wall are associated with full-size cross-sections.

39. An electrochemical cell as in claim 38 wherein said toed-in edge region of said first side wall provides improved interaction with said seal and said cathode assembly while retaining at least 99% of the anode volume associated with a corresponding anode can wherein the entireties of both said intermediate region and said edge region of said first side wall are associated with full-size cross-sections.

40. An electrochemical cell as in claim 23, said intermediate region of said first side wall being associated with a first full-size cross-section portion of said anode can, between said top wall and said edge region, said edge region providing a second reduced-size cross-section portion of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.12 cm$^3$ to about 0.20 cm$^3$, an anode volume being defined inwardly of said first side wall, the fraction of the anode volume defined by said second portion being small compared to the fraction of the anode volume defined by said first portion, said toed-in edge region of said first side wall providing improved interaction with said seal and said cathode assembly while retaining at least 97% of the anode volume associated with a corresponding anode can wherein the entireties of both said intermediate region and said edge region of said first side wall are associated with full-size cross-sections.

41. An electrochemical cell as in claim 40 wherein said toed-in edge region of said first side wall provides improved interaction with said seal and said cathode assembly while retaining at least 99% of the anode volume associated with a corresponding anode can wherein the entireties of both said intermediate region and said edge region of said first side wall are associated with full-size cross-sections.

42. An electrochemical cell as in claim 23, said intermediate region of said first side wall being associated with a first full-size cross-section portion of said anode can, between said top wall and said edge region, said edge region providing a second reduced-size cross-section portion of said anode can, said anode and said cathode being joined together with said seal between said first and second side walls and, in combination, defining a top and a bottom of said cell, and a cell height therebetween, said second side wall defining a maximum perimeter of said electrochemical cell thereabout, said cell height and said maximum perimeter, in combination, defining an overall volume of said electrochemical cell, said overall volume being about 0.06 cm$^3$ to about 0.12 cm$^3$, an anode volume being defined inwardly of said first side wall, the fraction of the anode volume defined by said second portion being small compared to the fraction of the anode volume defined by said first portion, said toed-in edge region of said first side wall providing improved interaction with said seal and said cathode assembly while retaining at least 96% of the anode volume associated with a corresponding anode can wherein the entireties of both said intermediate region and said edge region of said first side wall are associated with full-size cross-sections.

43. An electrochemical cell as in claim 42 wherein said toed-in edge region of said first side wall provides improved interaction with said seal and said cathode assembly while retaining at least 98% of the anode volume associated with a corresponding anode can wherein the entireties of both said intermediate region and said edge region of said first side wall are associated with full-size cross-sections.

44. An electrochemical cell as in claim 23, said edge region having a distal edge remote from said top wall, said first side wall following a path from an intermediate region of said first side wall, between said top wall and said edge region, to said distal edge wherein no element of the path is directed toward said top wall.

45. A method of making an electrochemical cell assembly, the method comprising the steps of:
  (a) fabricating an anode, including making an anode can, by
    (i) fabricating a metal structure into a metal cup-shaped anode can precursor having a top wall, and a side wall depending downwardly from the top wall to an edge region thereof, the side wall having an intermediate region between the top wall and the edge region,
    (ii) urging the edge region of the anode can precursor inwardly and thereby permanently displacing the edge region inwardly of the intermediate region, and thereby making the anode can, and
    (iii) placing anode material in said anode can; and
  (b) assembling the so-fabricated anode with a cathode, thereby to make the electrochemical cell.

46. A method of making an electrochemical cell assembly as in claim 45, the anode can having an inner surface, the material of the side wall at and proximate the inner surface of the anode can as the can is incorporated into the electrochemical cell assembly corresponding in composition to the material of the side wall at and proximate the inner surface of the anode can as fabricated in step (b).

47. A method as in claim 45, the side wall having an inner surface and an outer surface, and a thickness between the inner surface and the outer surface, the displacing of the edge region inwardly comprising displacing the edge region inwardly of the outer surface of the intermediate region a distance less than the thickness of the side wall.

48. A method as in claim 45, the side wall comprising a side wall structure having an average thickness of about 0.075 mm. to about 0.250 mm.

49. A method as in claim 45, the side wall comprising a side wall structure having an average thickness of about 0.090 mm. to about 0.150 mm.

50. A method as in claim 45, the side wall comprising a side wall structure having an average thickness of about 0.114 mm. to about 0.140 mm.

51. A method as in claim 45, including in step a(ii), moving the anode can precursor and an internal mandrel together into a die pocket, and displacing the edge region of the anode can precursor inwardly against the internal mandrel as the anode can precursor and the internal mandrel are thus moved downwardly together.

52. A method of assembling a cup-shaped anode can to a seal to make an anode subassembly, the anode can having a top wall, and a first side wall depending downwardly from the top wall to a bottom edge of the side wall, the seal comprising a cylindrical second side wall, the respective circumferences of the first and second side walls being configured and arranged such that the anode can can be assembled inside the seal, with an outer surface of the first side wall in surface-to-surface engagement with an inner surface of the second side wall, by urging the bottom edge of the first side wall into the seal at a top of the seal, and progressively downwardly through the seal to a bottom of the seal to thereby make the anode subassembly, the method including progressively engaging an abutment element of the first side wall, removed from the bottom edge, in surface-to-surface engagement with the inner surface of the second side wall, as the anode can is respectively advanced along the seal, such that the abutment element progressively expands the second side wall adjacent the advancing bottom edge of the anode can.

53. A method as in claim 52 wherein the abutment element expands the second side wall adjacent the bottom edge sufficient to prevent the bottom edge from touching the second side wall.

54. A method as in claim 52 wherein the abutment element expands the second side wall ahead of the progressive advance of the bottom edge.

55. A method as in claim 52 wherein the second side wall is tapered inwardly from top to bottom.

56. An electrochemical cell made with an anode subassembly made according to a method of claim 52.

57. An electrochemical cell made with an anode subassembly made according to a method of claim 53.

58. An electrochemical cell made with an anode subassembly made according to a method of claim 54.

59. A method as in claim 45, the side wall having an inner surface and an outer surface, and a thickness between the inner surface and the outer surface, the displacing of the edge region inwardly comprising displacing the edge region inwardly of the outer surface of the intermediate region a distance of up to about 0.008 inch.

60. A method of making a toed-in can, the method comprising the steps of:
  (a) fabricating a metal structure into a metal cup-shaped can precursor having a top wall, and a side wall depending downwardly from the top wall to an edge region thereof, the side wall having an intermediate region between the top wall and the edge region; and
  (b) moving the can precursor and an internal mandrel together into a die pocket, and displacing the edge region of the can precursor inwardly against the internal mandrel as the can precursor and the internal are thus moved together.

61. A method as in claim 60, the side wall having an inner surface and an outer surface, and a thickness between the inner surface and the outer surface, the displacing of the edge region inwardly comprising displacing the edge region inwardly of the outer surface of the intermediate region a distance of up to about 0.203 mm.

62. A method as in claim 60, the side wall having an inner surface and an outer surface, and a thickness between the inner surface and the outer surface, the displacing of the edge region inwardly comprising displacing the edge region inwardly of the outer surface of the intermediate region a distance of about 0.025 mm to about 0.203 mm.

63. A method as in claim 60, the side wall having an inner surface and an outer surface, and a thickness between the inner surface and the outer surface, the displacing of the edge region inwardly comprising displacing the edge region inwardly of the outer surface of the intermediate region a distance of about 0.038 mm to about 0.102 mm.

64. A method as in claim 60, the side wall having inner and outer surfaces, and a thickness between the inner and outer surfaces of about 0.075 mm to about 0.250 mm.

65. A method as in claim 60, the side wall having inner and outer surfaces, and a thickness between the inner and outer surfaces of about 0.090 mm to about 0.150 mm.

66. A method as in claim 60, the side wall having inner and outer surfaces, and a thickness between the inner and outer surfaces of about 0.114 mm to about 0.140 mm.

* * * * *